April 21, 1959
R. E. OSBORNE ET AL
2,882,955
CORRUGATING MACHINE
Filed Feb. 8, 1957
5 Sheets-Sheet 3
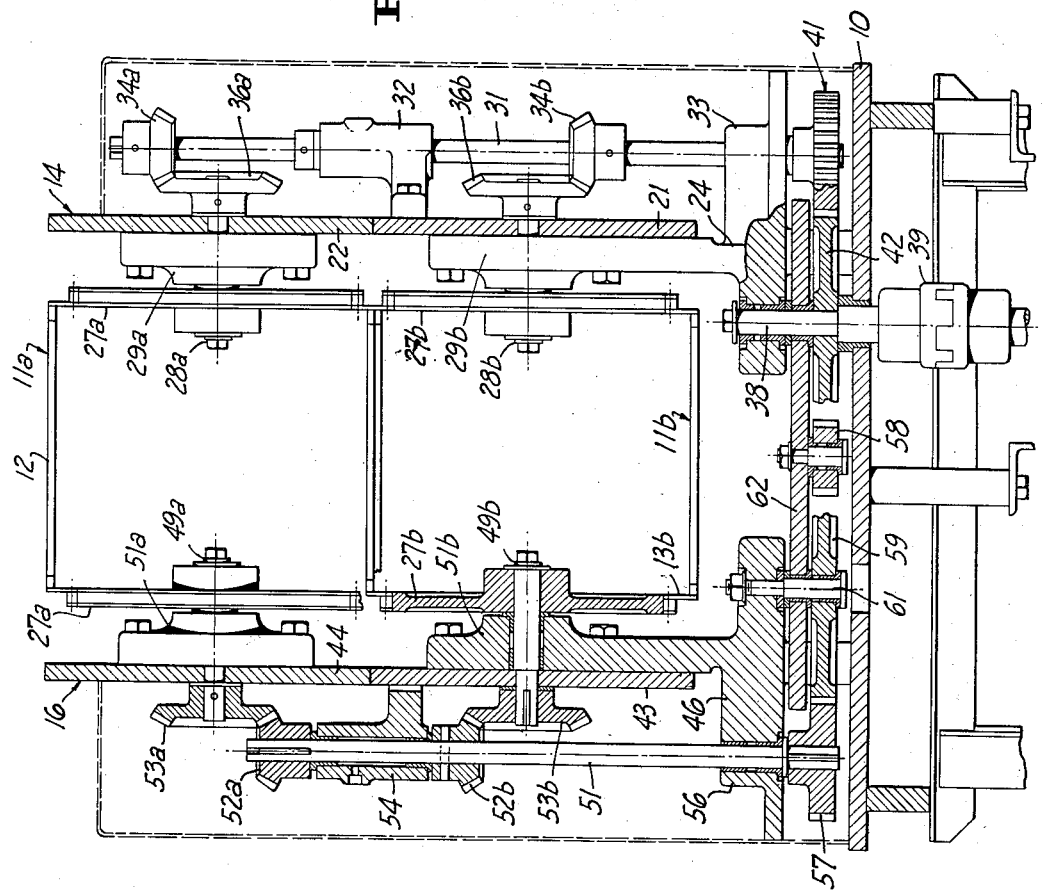
INVENTORS
RUSSELL E. OSBORNE
STANLEY H. MOYER
BY LAWRENCE D. COYNE
ATTORNEYS

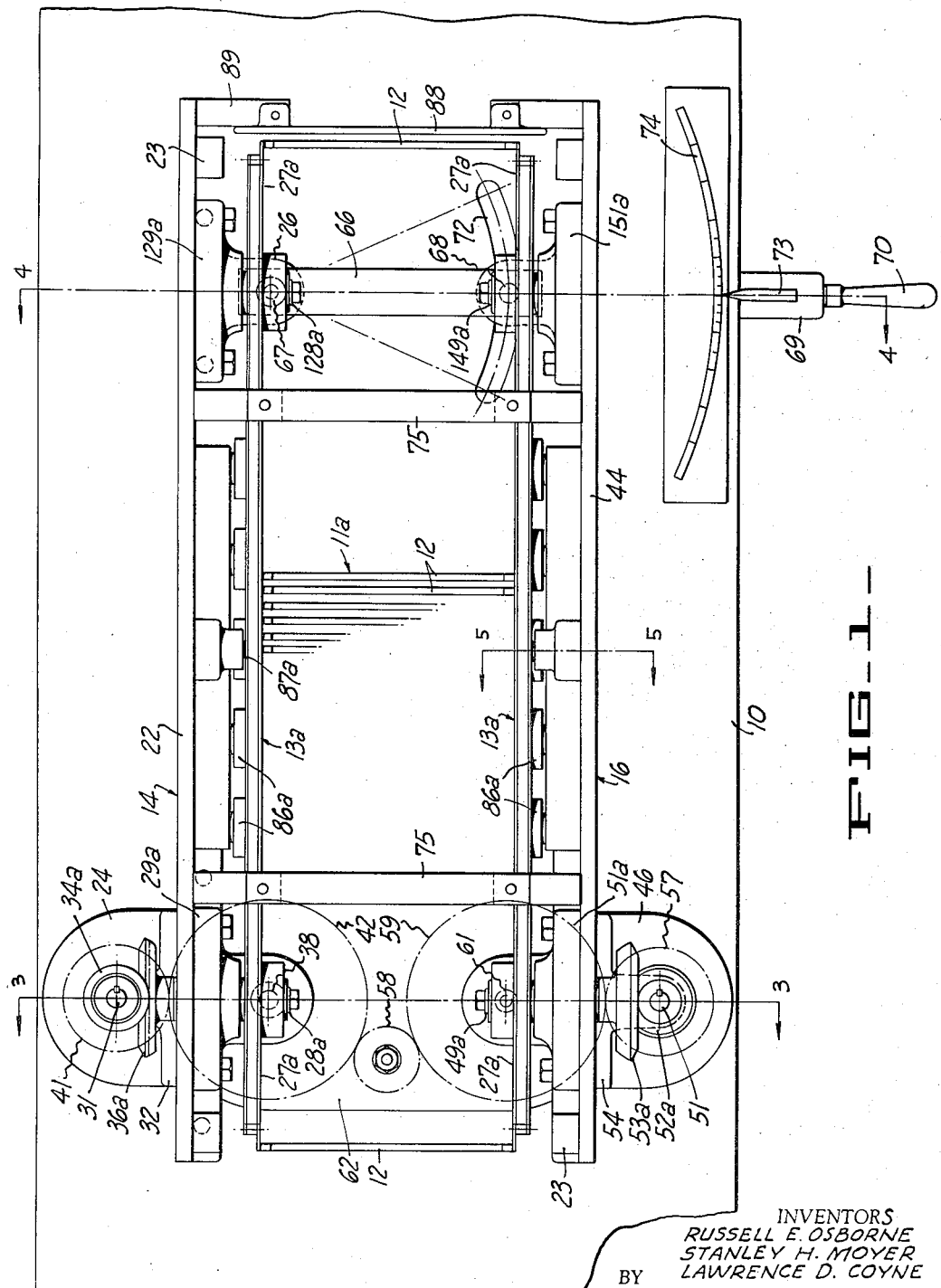

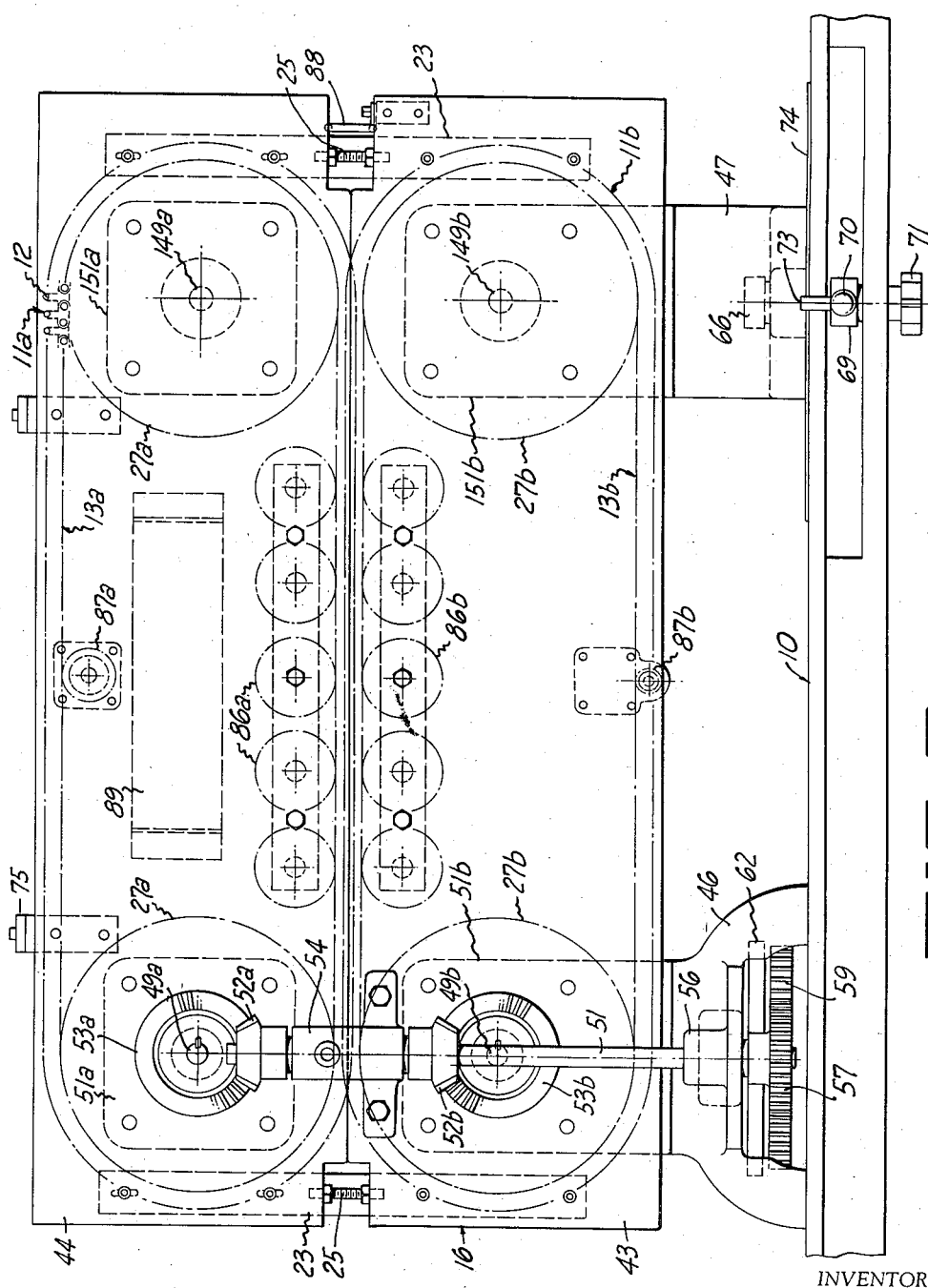

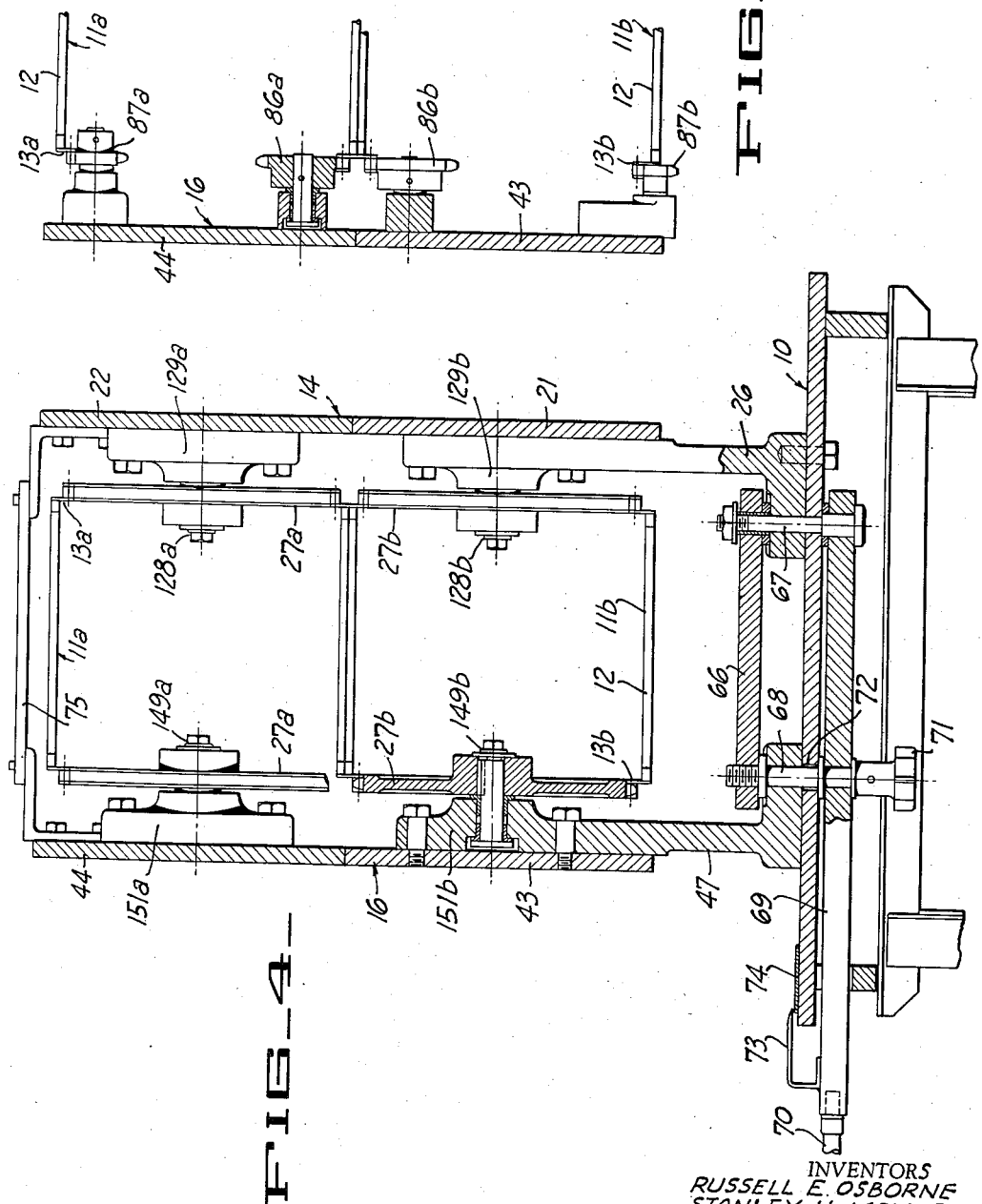

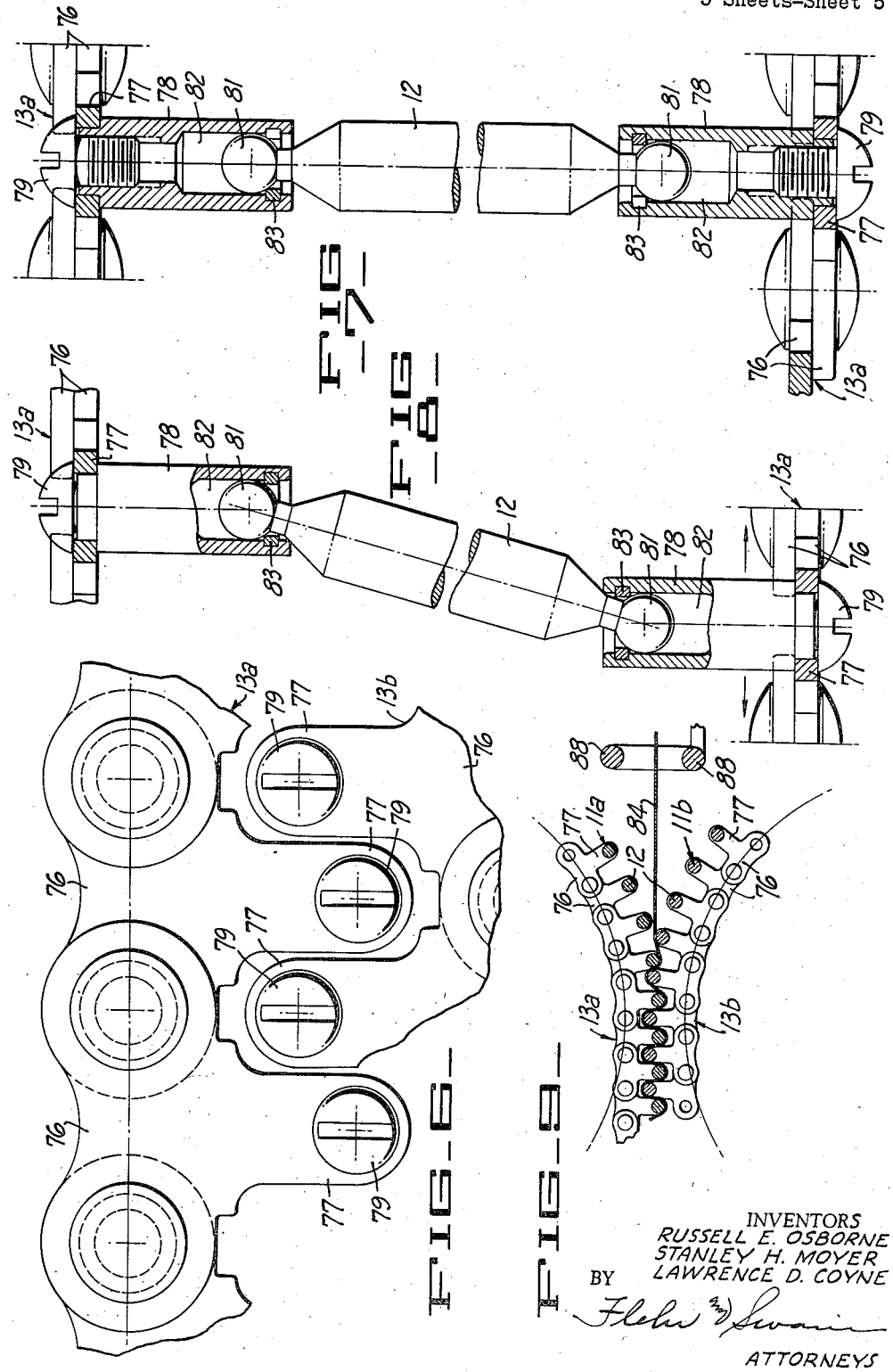

United States Patent Office 2,882,955
Patented Apr. 21, 1959

2,882,955
CORRUGATING MACHINE

Russell E. Osborne and Stanley H. Moyer, Mill Valley, and Lawrence D. Coyne, San Francisco, Calif., assignors to Products and Production Devices Co., San Francisco, Calif., a partnership Application February 8, 1957, Serial No. 638,952

5 Claims. (Cl. 154—30)

This invention relates generally to machines for corrugating strips of material, such as paper, fibreboard, sheet metal or the like.

It is a general object of the present invention to improve upon corrugating machines of the type disclosed and claimed in Patent 2,663,351, granted December 22, 1953. The machine in that instance consists of a pair of endless conveyors having confronting portions between which the material is fed. Each of the conveyors comprises spaced parallel elongated members about which the material is bent, together with endless carriers to which the elongated members are pivotally attached. Provision is made for adjusting the support means for the conveyor whereby the angularity of the elongated members relative to the direction of movement of the same, can be adjusted. This makes it possible to corrugate a strip of material with any angularity desired between the corrugations and the edges of the strip. The machine disclosed in said patent is constructed in such a manner that adjustments to obtain the desired angularity, changes the alignment of the machine with respect to other parts with which it may be used.

In general it is an object of the present invention to improve upon machines of the type disclosed in said Patent 2,663,351, particularly by providing for angularity adjustments without affecting the alignment of the machine relative to other machines with which it is associated.

Another object of the invention is to provide improved means for resisting the forces required for applying corrugations to the material.

Another object of the present invention is to provide improved means for attaching the ends of the elongated members to their associated endless carriers.

Additional objects and features of the invention will appear from the following description in which the preferred embodiment has been set forth in detail in conjunction with the accompanying drawing.

Referring to the drawing:

Figure 1 is a plan view illustrating a machine in accordance with the present invention.

Figure 2 is a side elevational view of the machine shown in Figure 1.

Figure 3 is a cross sectional view taken along the line 3—3 of Figure 1.

Figure 4 is a cross sectional view taken along the line 4—4 of Figure 1.

Figure 5 is an enlarged cross sectional detail taken along the line 5—5 of Figure 1.

Figure 6 is a detail on an enlarged scale illustrating the manner in which portions of the carrier chain interlace.

Figure 7 is an enlarged cross sectional detail illustrating an improved means of attaching the elongated members to their associated carrier chains.

Figure 8 is a view like Figure 7 but showing a different angularity.

Figure 9 is a detail illustrating the manner in which the machine corrugates a strip of material.

In general the present machine consists of a frame forming a horizontal working table 10 (Figures 1 and 2) over which a strip of material is passed for the corrugating operation. Two conveying means are indicated generally by numerals 11a and 11b, and each means consists of a plurality of elongated elements 12, having their ends pivotally attached to endless carriers in the form of chains 13a, 13b (Figure 9). Support means designated generally by numerals 14 and 16, are carried by the table, and serve to mount means which engage and retain the endless chains.

The support means 14 preferably consists of a pair of metal plates 21 and 22 (Figure 3) disposed in a vertical plane and adjustably connected at their ends by straps 23 (Figure 2). Screw jacking means 25 permits raising or lowering of the upper plate 22 to a desired adjusted position. Brackets 24 (Figure 3) and 26 (Figure 4) serve to fix the plates 21 and 22 with respect to the table 10. Two sets of sprockets 27a and 27b, engage and serve to operatively retain the endless chains 13a and 13b. Those sprockets that are located adjacent the support means 14, are carried by the two upper shafts 28a, 128a, and the two lower shafts 28b, 128b. These shafts are spaced longitudinally of the machine, and are journalled in the bearings 29a, 129a and 29b, 129b. The shafts 28a, 28b at one end of the machine are driven from a common vertical shaft 31. This shaft is carried by the journals 32 and 33, and is provided with bevelled pinions 34a and 34b, which mesh with the bevelled gears 36a, 36b on the corresponding shafts 28a and 28b.

A main vertical drive shaft 38 extends through the table 10, and is connected by a coupling 39 with a motor. The center of this shaft is in line with the axes of the corresponding shafts 28a and 28b, and in addition its axis is coincident with a plane corresponding to the points of pivotal connection between the elongated members 12, and the corresponding endless chains. Shafts 31 and 38 are operatively connected by gears 41 and 42.

The support means 16 similarly consists of the plates 43 and 44, which are adjustably connected and carried by the brackets 46, 47 (Figure 1). Both of these brackets are carried by the table but are connected to means whereby they can be shifted to various positions, while maintaining the plates 43 and 44 parallel to the plates 21 and 22. Bracket 47 is provided with depending legs 48 which rest upon the table 10.

The sprockets 27a, 27b located adjacent the plates 43 and 44, are carried by shafts 49a, 149a and 49b, 149b, which in turn are carried by the bearings 51a, 151a and 51b, 151b. The shafts 49a, 49b, located at that end of the machine occupied by the drive shaft 38, are operatively connected to the vertical shaft 51. This shaft carries the bevelled pinions 52a, 52b, which mesh with the bevelled gears 53a, 53b, and the corresponding shafts 49a, 49b. Shaft 51 is carried by the journals 54, 56, and its lower end has a drive connection with the main drive shaft 38. This drive connection includes gear 57 on the lower end of shaft 51, idler gear 58 which meshes with gear 42, and gear 59, which meshes with both gear 57 and idler 58. Gear 59 is rotatably carried by the shaft 61, which in turn is secured to the bracket 46. Idler gear 58 is carried by the arm or plate 62, one end of which is pivoted about the drive shaft 61. Shaft 61 likewise has its axis in alignment with the corresponding shafts 49a, 49b, and coincident with a plane corresponding to the pivotal connections between the elongated members 12, and the corresponding sprocket.

At the other end of the machine, the bracket 26 is securely attached to the work table as shown in Figure 4, while the bracket 47 is free to be shifted for desired adjustment. A connecting link 66 has its one end pivotally connected to the fixed pin 67, and its other end attached to a pin 68, which extends through the foot of the bracket 47. A manually moveable arm 69 extends beneath the table 10, and is provided with a handle 70 at its outer end (Figure 1). The inner end of this arm (Figure 4) is pivotally attached to the pin or shaft 67, and an intermediate portion is attached to the pin 68. A knob 71 is secured to the lower end of pin 68, and the upper end of the pin has threaded engagement with the link 66, whereby upon turning the knob 71, the bracket together with the arm 69 can be clamped and thereby fixed with respect to the table. Table 10 is provided with an arcuate slot 72 (Figure 1) to accommodate movements of the pin 68 throughout its range of adjustment. Also the arm 69 is provided with a pointer 73 which is associated with graduations 74 on the table, whereby the operator can quickly obtain the desired adjustment.

Pin 67 is located with its axis aligned with the axes of the corresponding shafts 128a and 128b, and likewise coincident with the plane of the points of connection between the elongated members, and the corresponding chain. The same is true of the pin 68.

Upper parallel links 75 and 75 (Figure 1) are pivotally attached to the upper portions of plates 22 and 44 to steady the same.

Figures 6-8 illustrate a preferred construction for attaching the ends of the elongated members 12 to the carrier chains. The carrier chains in this instance are constructed of links 76, which are provided with longitudinally spaced and inwardly extending lugs or tabs 77 (Figure 6). The tabs carry means forming universal connections with the ends of the rods 12. The means in this instance consist of studs 78 which are attached to the tabs 77 by screws 79. The ends of the rods are machined to provide balls or spheres 81 loosely interfitting the sockets 82 provided within the studs 78. The studs are recessed to accommodate the spring snap-in retaining rings 83, which serve to retain the balls with respect to the studs. This type of connection is one of the universal type, which permits various degrees of angularity between the elongated members 12, and the carrier chains.

In normal operation the carrier chains are set whereby confronting portions of their tabs 77 interlace in the manner illustrated in Figure 9. The elongated elements or rods 12 are caused to interlace, thereby applying corrugations to a strip 84 of material being fed to the machine.

Where the machine is to be used for relatively heavy corrugating operations, it is desirable to provide means for supporting the confronting portions of the conveying means. For this purpose we have shown upper and lower sets of supporting idler sprockets 86a, 86b. These sprockets can be disposed as illustrated in Figures 2 and 5, to engage the adjacent portions of the carrier chains, and thus maintain these chains at a fixed spacing irrespective of the force required to bend the strip of material about the rods 12. When employed, such supporting idler sprockets are provided upon both sides of the machine.

Additional idler sprockets 87a, 87b (Figure 5) can be provided for supporting the top runs of the carrier chains 13a, and the bottom runs of the carrier chains 13b.

Suitable guide means can be provided for the strip being fed to the machine. For this purpose we have shown upper and lower parallel guide rods 88 attached together at their ends, and pivotally carried by the blades 89 on the plates 22 and 44 (Figures 1, 2, 9).

When corrugating paper or like material formed of cellulose pulp, it is desirable to provide a source of heat. For this purpose we have shown electrical heaters 89 (Figure 2).

Operation of our machine can be reviewed as follows: When the main drive shaft 38 is being driven, all of the carrier chains and associated sprockets are driven in synchronism, and the confronting portions of the conveyors interlace as previously described. For the adjustment of the arm 69 shown in Figure 1, the elongated members 12 extend at right angles to their direction of movement, and therefore a strip of material fed to the machine would be corrugated along lines extending at right angles to the length of the strip. Assuming however that one desires to corrugate the strip obliquely, then the position of arm 69 is shifted to provide the angle desired. Movements of the arm 69 serve to bodily shift the support means 16, together with its corresponding sprockets and endless chains, while at the same time maintaining the support means 14 and 16, and also the carrier chains in parallel relationship. The drive to the sprockets is not affected by the various adjustments, because of the special drive connections between the main shaft 38, and the vertical shafts 31 and 51. Irrespective of the manner in which the machine is adjusted, the line of movement of the strip through the machine remains substantially the same, and therefore the alignment of the machine with respect to associated devices is not affected.

While the machine has been described as operating with its table horizontal, it will be evident that it can be operated in various positions.

We claim:

1. In a machine adapted to apply corrugations to a strip of material supplied thereto, a pair of endless conveyors having confronting portions through which the strip of material is fed to corrugate the same, each of the conveyors comprising spaced parallel elongated members about which the material is bent together with a pair of endless carriers attached to the ends of said members, means forming a stationary table, two support means carried by the table and extending parallel to the direction of movement of said members, one of said support means being fixed to the table and the other being movable relative thereto, means journalled on said support means serving to engage and retain said endless carriers, and means serving to shift said other support means while maintaining the same parallel to said one support means, whereby the angularity of said members relative to the direction of movement of the same is adjusted.

2. A machine as in claim 1 together with additional conveyor support means engaging the confronting portions of the carriers.

3. In a machine for corrugating a strip of material fed thereto, a pair of endless conveyors having confronting portions through which the strip of material is fed to corrugate the same, each of said conveyors comprising spaced parallel elongated members about which the material is fed together with a pair of endless carriers pivotally attached to the ends of said members, means forming a stationary table, support means carried by the table and extending parallel to the direction of movement of said members, one of said support means being fixed to the table and the other being movable relative thereto, sprocket means journalled on said support means serving to engage and retain said endless carriers, and means serving to adjustably shift said other support means relative to said one support means and to said table, while maintaining said two support means parallel, whereby the angularity of said members relative to the direction of movement of the same is adjusted.

4. In a machine adapted to corrugate a strip of material supplied thereto, a frame forming a work table, a pair of laterally spaced support means carried by the table, one of said support means being fixed to the table and the other being movable relative thereto, said support means extending perpendicular to the table and parallel to each other, two pairs of sprockets rotatably carried by each of said support means, endless carrier chains engaging each pair of sprockets, elongated members extending between corresponding portions of said endless chains and having pivotal connections thereto, said chains together with said elongated members forming two coveyors having confronting portions through which the material is fed to corrugate the same, means for driving corresponding ends of said chains in unison, and means for adjustably shifting said other support means relative to said one support means, while maintaining the two support means parallel to each other, whereby the angularity of said elongated members with respect to the direction of movement of the same, is adjusted.

5. A corrugating machine as in claim 3 in which said drive means comprises two shafts disposed adjacent the said support means and each having driving connection with the corresponding chain sprockets, a main drive shaft having its axis coincident with the points of connection of the elongated members with the endless chains at that side of the conveying means adjacent the stationary support means, and drive means serving to operatively connect said main drive shaft with both said first named shafts.

References Cited in the file of this patent

UNITED STATES PATENTS

| | | |
|---|---|---|
| 1,829,552 | Weatherhead | Oct. 27, 1931 |
| 2,663,351 | Osborne, et al. | Dec. 22, 1953 |